(No Model.) 2 Sheets—Sheet 1.
A. J. AVERY.
PANELING AND STRIPING IMPLEMENT.
No. 399,233. Patented Mar. 12, 1889.
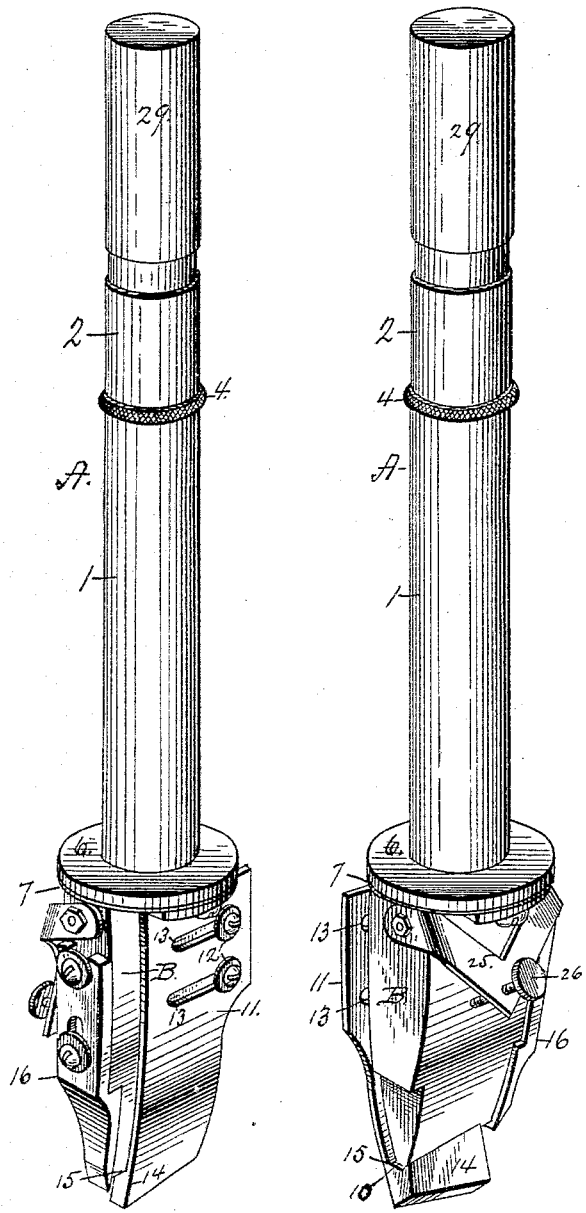
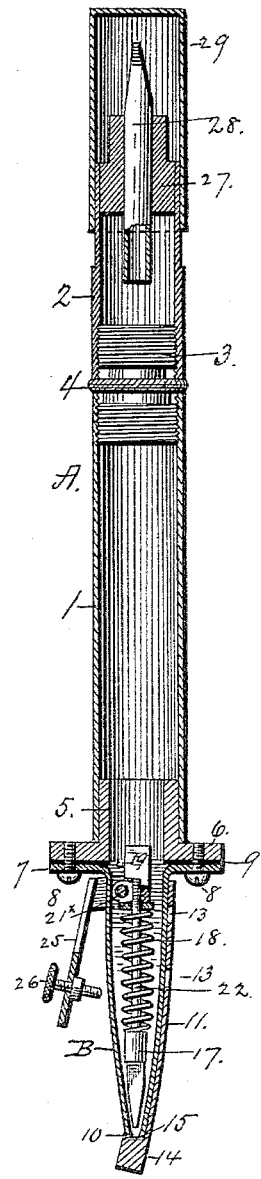
WITNESSES
F. L. Ourand
L. C. Dallas
INVENTOR,
Andrew J. Avery
by A. G. Hufman
Attorney.

(No Model.) 2 Sheets—Sheet 2.
A. J. AVERY.
PANELING AND STRIPING IMPLEMENT.
No. 399,233. Patented Mar. 12, 1889.
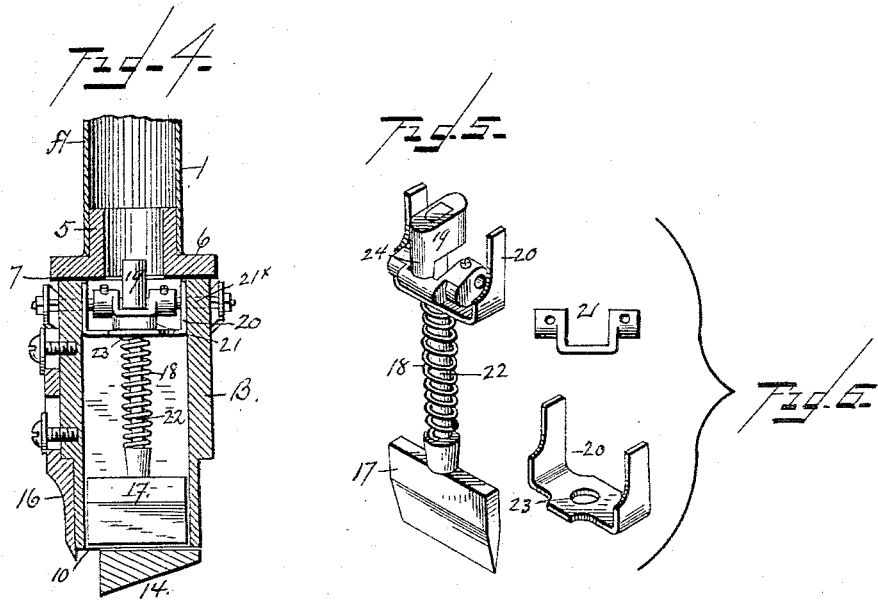
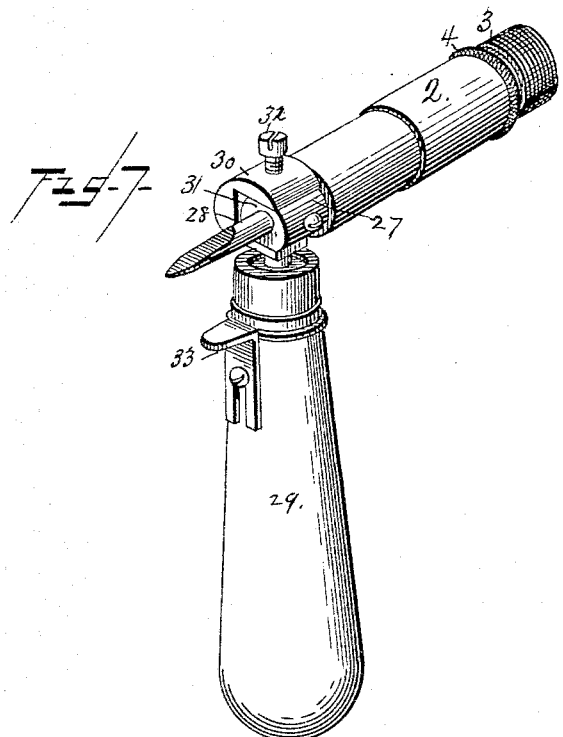
WITNESSES.
F. L. Ourand
S. C. Dallas
INVENTOR.
Andrew J. Avery
by A. G. Heylmun.
Attorney.

UNITED STATES PATENT OFFICE.

ANDREW J. AVERY, OF NORWAY, MAINE.

PANELING AND STRIPING IMPLEMENT.

SPECIFICATION forming part of Letters Patent No. 399,233, dated March 12, 1889.

Application filed October 24, 1888. Serial No. 289,030. (No model.)

*To all whom it may concern:*

Be it known that I, ANDREW J. AVERY, a citizen of the United States of America, residing at Norway, in the county of Oxford, in the State of Maine, have invented a new and useful Implement for Paneling and Striping the Soles of Boots or Shoes, of which the following is a specification.

My invention has relation to improvements in tools or implements for applying the panels and stripes to the soles of boots or shoes; and the object is to provide an improved implement for the purposes named whereby the panels and stripes which ornament the surfaces of the soles of finished boots or shoes may be applied with expedition and regularity and in any predetermined width or color.

I accomplish the objects of my invention by the improved combined striping and paneling tool illustrated in the accompanying drawings, wherein—

Figure 1 is a perspective of the paneling-tool, showing the adjustable marking-knife and the adjustable guard. Fig. 2 is a perspective in reverse of that shown in Fig 1 and illustrating the position of the guard on the end of the implement and the yoke-lever which operates the plunger which regulates the flow of ink or other coloring material contained in the implement. Fig. 3 is a central vertical sectional view showing the interior arrangement of the mechanism. Fig. 4 is a central vertical sectional view taken transversely to that shown in Fig. 3. Fig. 5 is a detail view of the spring-actuated plunger, the yoke on the stem of the plunger, and the crank-lever to withdraw the plunger in engagement with the lug on the end of the plunger. Fig. 6 is a detail of the yoke on the plunger and the crank-lever. Fig. 7 is a perspective of the striping end or part of the implement separated from the other or paneling portion and the handle clamped thereto in operative relation.

Reference being had to the drawings, A designates the tube of the implement, which for the purpose of adapting it for using different colors of ink and to serve the complete purposes of the implement is made in two parts, 1 2, to the former of which is secured the paneling-tool, and to the latter is secured the striping-tool, the two parts of the tube being connected by a double-end threaded plug, 3, and having a finger-rib, 4, to enable the parts to be conveniently connected and separated. In the lower end of the longer part of the tube is arranged a hollow sleeve, 5, formed with a flange, 6, to which is secured the paneling reservoir or shell.

B designates the shell constituting the paneling end of the tool and within which is contained the mechanism which controls the flow of coloring material to the sole of the shoe. This shell is of metal, having a flange, 7, at its upper end to set against the flange of the sleeve 5, to which it is secured by means of short screws 8, a packing, 9, being inserted between the faces of the flanges to make the joint fluid-tight. The shell B is wedge-shaped and has a slot, 10, in its point, in which the end of the blade of the plunger fits and through which the fluid finds its way when the implement is used.

On the exterior of the shell is arranged a guard or gage, 11, consisting of a plate adjustably held to the shell by means of screws 12 let through slots 13 in the plate. This guard terminates in a gage-piece, 14, projecting below the end of the shell and formed with a channel or groove, 15, neatly and snugly fitted over the end of the shell to restrain the ink from flowing from the slot, except at the part left free between the inner edge of the guard and the scoring-knife, and also hold the guard firmly to the shell at the point of engagement. On the edge or side of the shell is adjustably secured the scoring-knife 16, held in place by screws projected through slots, substantially as seen in Figs. 1 and 4.

In the interior of the shell B is the plunger 17, having a spring, 18, and clip, 19, a yoke, 20, and crank 21, mounted on a shaft, $21^{\times}$. The plunger 17 is formed with a stem, 22, which rests and slides in a bearing, 23, in the yoke 20, which supports the stem of the plunger. The lower end of the plunger is formed to fit the interior of the shell and has its end wedge-shaped to fit on the slit of the shell. The clip 19 is fixed on the end of the stem of the plunger, and is formed with an inwardly-extended lug, 24, which bears against the wrist of the crank-piece 21, the force of the spring being to keep the plunger normally in the end of the shell. The crank-piece 21 is mounted, as heretofore stated, on a shaft, $21^{\times}$, having its ends projected outside of the shell, and on these projecting ends is arranged a thumb-lever, 25, in the end of which is a regulating-screw, 26.

It will be seen from the foregoing description that by pressing the thumb-lever down until the end of the regulating-screw sets on the shell, the crank-piece is turned upward and draws the plunger upward and out of the slot of the shell, thus enlarging the aperture and permitting an increased flow of fluid, and that when the pressure is removed from the thumb-lever the force of the spring carries the plunger down in the slot of the shell, closes the same, and prevents the flow of the fluid. By regulating the position of the screw in the thumb-lever the movement of the plunger is correspondingly affected.

The tube part 2, which constitutes the striper and is especially adapted to make the stripes on the shank of the shoes when connected to the other tube, or that constituting the paneling-tube, as seen in Fig. 3, but which may be used for striping any part and especially the fore part of the sole when separated from the paneling end and when the handle is fixed thereto, has arranged on its upper end a plug, 27, having an inking-tube, 28, detachably fixed therein, as seen in Fig. 3 of the drawings. The end of the inking-tube 28 is tapered at the end and slitted to permit the flow of the coloring material, and over the tube end is fitted a cap-piece, 29, which covers and shields the inking-tube, substantially as seen in the drawings. As mentioned heretofore, when the tubes are connected, as shown in Fig. 3 of the drawings, the inking-tube 28 is especially useful for striping the sole of the shoe, since no gage can well be used on that part of the shoe, and the width of the stripe may be according to the width of the slit in the inking-tube.

To adapt the implement to different widths of stripes, interchangeable inking-tubes are provided having different capacity of flow. The other or paneling end of the implement is used for paneling the shoes, the flow of ink being regulated by the adjustment of the set-screw in the thumb-lever and the width of the panel being determined by adjustment of the guard on the shell. The score made by the knife prevents the spread of the ink beyond the score.

To adapt the implement for striping in regular lines the fore part of the sole, the tubes of the implement are made separable, so that a handle may be attached to the striping end of the tube. The implement in condition of a gage-striper is shown in Fig. 7 of the drawings, wherein the handle 29 is provided with a clip, 30, which fits over the end 31 of the striper, and is held tight by a set-screw, 32, as shown. On the handle is an adjustable guard-piece, 33, held in position by a set-screw, as shown. By adjusting the guard in any position toward or from the point of the inking-tube the stripe will be laid regularly on the sole.

Having thus described the distinguishing features of my improved implement, I hereinbelow particularly point out and distinctly claim the elements and their combinations which I claim to be my invention, as follows:

1. In a paneling implement, the combination, with a hollow handle, of a shell formed with an ink-slot in its end, a spring-actuated plunger in the shell adapted to set with its end in the slot of the shell, and a lever connected to the plunger to lift it from the slot in the end of the plunger, substantially as described.

2. In a paneling implement, the combination, with a hollow handle, of a shell formed with an ink-slot in its end, a spring-actuated plunger in the shell arranged to set with its end in the slot of the shell, a lever connected to the plunger to lift it from the slot in the shell, and an adjustable gage or guard fitted on the shell with its gage-piece adapted to close the slot in the end of the shell, substantially as described.

3. The paneling-instrument composed of the hollow handle, a shell formed with an ink-slot in its end, a spring-actuated plunger in the shell arranged to set with its end in the slot thereof, a lever connected to the plunger to lift from the slot in the shell, an adjustable guard or gage fitted on the shell, and a scoring-knife to score the sole of the shoe, substantially as described, and for the purpose stated.

4. In a paneling implement, the combination of an ink-holding tube, a shell on the tube having an ink-slot in its end, and a gage adjustably fixed on the shell, with the gage part formed to project below the end of the shell and having a channel to set over and close the slot in the shell, substantially as described, and for the purpose stated.

5. The paneling and striping implement consisting of a separable ink-tube having a partition at the point of separation, a paneling-tool fixed to one end of the tube, and a striping-tool fixed to the other end, substantially as described.

6. The combined paneling and striping implement, composed of a separable ink-tube having a partition at the point of separation, a paneling-tool fixed to one end of the tube, and a striping-tool fixed to the other end, said striping-tool consisting of a plug fixed in the tube, and a striping-tube projected through the plug, substantially as described.

7. The combined paneling and striping implement, composed of a paneling-tool, a striping-tool separably attached to the paneling-tool, and a handle having a gage-piece detachably connected to the striping-tool, substantially as described, and for the purpose specified.

In witness whereof I have hereunto set my hand in the presence of two attesting witnesses.

ANDREW J. AVERY.

Attest:
H. W. BEANE,
H. D. SMITH.